UNITED STATES PATENT OFFICE.

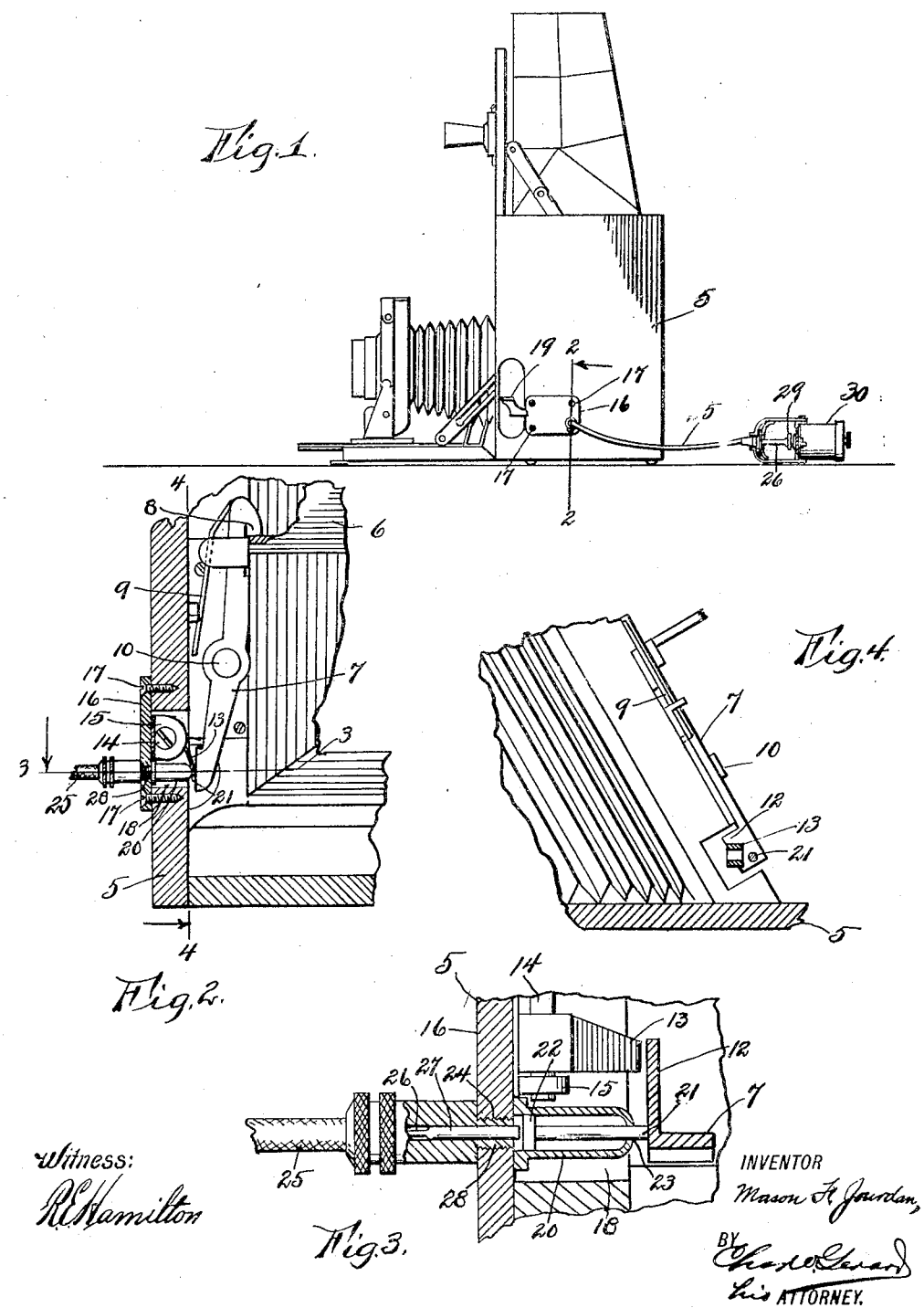

MASON F. JOURDAN, OF MUSKOGEE, OKLAHOMA.

CAMERA-TRIPPING DEVICE.

1,337,603.   Specification of Letters Patent.   Patented Apr. 20, 1920.

Application filed November 25, 1919. Serial No. 340,526.

*To all whom it may concern:*

Be it known that I, MASON F. JOURDAN, a citizen of the United States, and resident of Muskogee, county of Muskogee, State of Oklahoma, have invented a certain new and useful Improvement in Camera-Tripping Devices, of which the following is a complete specification.

The present invention relates to camera structures, and particularly to cameras of the mirror-focusing and exposure curtain type, and aims to provide an improved construction whereby a common form of commercial shutter tripping device may be applied to this type of camera for releasing the focusing mirror and exposure curtain through the same connections as the same are released by operation of the finger-tripping device commonly provided.

To this end I provide an auxiliary tripping device and secure the same to the frame of the camera in position for operative engagement with the lever which effects the release of the focusing mirror and exposure curtain, the arrangement also being such as to permit of the detachable connection of a suitable tripping device to the camera frame for effecting the tripping of said lever through the medium of said auxiliary device.

It is also sought to devise a neat, simple and inexpensive device of the character described, which may be readily and conveniently embodied in the camera structure, and which will not detract in any way from the appearance of the camera.

With these general objects in view the invention will now be described with reference to the accompanying drawing illustrating one form of embodiment of the same, after which the novel features therein will be particularly set forth and claimed.

In the drawings—

Figure 1 is a side view of a camera in which is embodied an auxiliary tripping device embodying the present invention;

Fig. 2 is an enlarged sectional detail view, taken on the line 2—2 of Fig. 1; and Figs. 3 and 4 are similar detail views representing sections taken on the lines 3—3 and 4—4, respectively, of Fig. 2.

Referring now to the said drawing in detail, this illustrates the improvements in relation to a camera of the focusing mirror and exposure curtain type, of a common commercial form known as the Graflex camera. In this type of camera the lens is focused by observation of the image as it is caught on the focusing mirror which is brought temporarily into proper position for this purpose, after which a tripping mechanism is operated for releasing the mirror to allow it to be moved into inoperative position and simultaneously releasing the exposure curtain whereby an exposure slit in said curtain is flashed across the plate or film. In the drawing the frame 5 of the camera is shown, together with the tripping mechanism and a portion of the mirror 6, the exposure curtain and connection thereto being omitted as unnecessary to an understanding of the invention, since these are operated through the medium of a connection with the mirror in a manner well known.

The releasing mechanism comprises a lever 7 provided with an engaging lug 8 at one end, said lever being actuated by a spring 9 normally into position for presenting said lug 8 into engagement with the mirror 6. The lever 7 is pivoted at 10 to the frame of the camera and has its lower end provided with a lug or ear 12 which is adapted to be engaged by an arm 13 fixed to a rocker shaft 14 mounted in bearings 15 provided on the inner face of a plate 16 attached by screws 17 over an opening 18 in the frame 5 opposite said lower end of the lever 7. The rocker shaft 14 also carries a finger engaging arm 19 projecting to the exterior of the camera for manual tripping operation in releasing the mirror and exposure curtain in the usual manner.

The details so far described comprise the usual construction of this type of camera, the tripping operation being effected by a person standing beside the camera and tripping the arm 19. The present improvement consists in providing a construction permitting the attachment of a suitable device for effecting the tripping operation from a distance or by the means of a suitable timing device forming a part of the attachment and effecting a delayed operation of the tripping means. One object of such deferred operation of the tripping means is, of course, to allow the person who would otherwise be obliged to trip the arm 19 by hand to be included in the picture to be taken by the camera.

The structure which I have devised for embodying the proposed feature of improvement comprises a sleeve member 20 adapted to be attached in any suitable manner to the inner face of the plate 18 opposite the lower end of the lever 7, said sleeve forming a slide bearing for a pin 21 having a piston head 22 fitting the bore of the sleeve, while the pin extends through an opening 23 in the free end of the sleeve opposite the lug or ear 12 of the lever 7. The plate 16 is formed with a threaded opening 24 at the base or attached end of the sleeve 20 and in register with the bore thereof. This permits of the application to said opening 24 of a common form of shutter-tripping device which comprises a flexible casing or tubing 25 inclosing a flexible thrust element 26 operating a plunger element 27 at one end of said casing 25 where the latter is provided with a screw nipple 28 adapted to be detachably connected with the plate 16 by being screwed into the opening 24. This enables the pin 21 to be operated by engagement of the thumb or finger of the operator with the knob 29 on the free end of the thrust element 26, thereby advancing said pin through the opening 23 against the lug 12 and rocking the lever 7. Normally the pin 21 is held retracted by the action of the spring 9 through the lever 7, and the pin is retained within the sleeve 20 by means of the margin of the opening 24, which opening is smaller than the head 22 of the pin and the bore of the sleeve 20, as illustrated in Fig. 3.

It will thus be apparent that I have provided a simple and efficient and yet inexpensive construction for carrying out the desired objects of the invention. The common commercial form of tripping attachment is by means of the improved arrangement and construction enabled to be used for tripping the mirror and exposure curtain of the type of camera described, the pin 21 and related parts being provided for bridging the gap between the lever and the end of the plunger 27, the latter being ordinarily designed for direct engagement with the part to be operated thereby. With the improved structure it is also apparent that a well-known form of time-trip device 30 may be attached to the free end of the casing 25 for operating the trip by engagement with the knob 29, as illustrated in Fig. 1, whereby a deferred tripping action is obtained, permitting the operator to assume a position in front of the camera.

While I have described what is now regarded as the preferred form of embodiment of the improvement, I desire to reserve the right to make such formal changes or modifications as may fairly fall within the scope of the appended claims.

What I claim is:

1. In a camera, the combination with a lever adapted to release the focusing mirror and exposure curtain, of tripping means for said lever comprising a trip element slidingly mounted in the frame of the camera and movable into position for engaging and tripping said lever.

2. In a camera, the combination with a lever adapted to release the focusing mirror and exposure curtain, of tripping means for said lever comprising a movable element mounted in the frame of the camera, and an attachment adapted to be removably connected with said camera frame and operative to move said element into engagement with said lever.

3. In a camera, the combination with a lever adapted to release the focusing mirror and exposure curtain, of tripping means for said lever comprising a sliding pin, a bearing carried by the frame of the camera and supporting said pin adjacent said lever, and an attachment adapted to be removably connected with the camera frame and operative to project said pin into tripping engagement with said lever.

4. In a camera, the combination with a lever adapted to release the focusing mirror and exposure curtain, of tripping means for said lever comprising a sliding pin, a bearing sleeve supporting said pin adjacent said lever, the camera frame being provided with an opening registering with one end of said sleeve, and an attachment adapted to be removably connected with the camera frame at said opening and operable therethrough to project said pin into tripping engagement with said lever.

In witness whereof I affix my signature.

MASON F. JOURDAN.